United States Patent
Martin et al.

(10) Patent No.: US 8,616,146 B2
(45) Date of Patent: Dec. 31, 2013

(54) SYSTEM FOR INDICATING AN AIRPLANE HARD LANDING

(75) Inventors: Dennis Wayne Martin, Woodinville, WA (US); James Paul Acks, Medina, OH (US)

(73) Assignee: Goodrich Corporation, Charlotte, NC (US)

( * ) Notice: Subject to any disclaimer, the term of this patent is extended or adjusted under 35 U.S.C. 154(b) by 357 days.

(21) Appl. No.: 13/041,083

(22) Filed: Mar. 4, 2011

(65) Prior Publication Data

US 2011/0214601 A1 Sep. 8, 2011

Related U.S. Application Data (60) Provisional application No. 61/310,888, filed on Mar. 5, 2010.

(51) Int. Cl.
*B64C 25/00* (2006.01)
*B64D 45/00* (2006.01)
*B64C 25/60* (2006.01)

(52) U.S. Cl.
USPC ................. 116/203; 116/283; 244/100 R (58) Field of Classification Search
USPC ............. 116/203, 272, 281, 283; 244/100 R
See application file for complete search history.

(56) References Cited

U.S. PATENT DOCUMENTS

| | | | | |
|---|---|---|---|---|
| 3,223,069 A | * | 12/1965 | Albright | 116/272 |
| 4,278,219 A | | 7/1981 | Finance | |
| 5,294,077 A | * | 3/1994 | Derrien | 244/104 FP |
| 5,927,646 A | * | 7/1999 | Sandy et al. | 244/108 |
| 6,676,075 B2 | | 1/2004 | Cowan et al. | |
| 8,051,995 B2 | * | 11/2011 | Kontetzki et al. | 213/1 A |
| 8,156,887 B2 | * | 4/2012 | Tan et al. | 116/303 |
| 8,234,994 B1 | * | 8/2012 | Branch | 116/203 |

FOREIGN PATENT DOCUMENTS

| | | | | | |
|---|---|---|---|---|---|
| GB | 2453554 A | * | 4/2009 | | B64C 25/34 |
| GB | 2465397 A | * | 5/2010 | | G01L 1/06 |
| GB | 2485803 A | * | 5/2012 | | B64C 25/28 |
| WO | WO 2011110829 A1 | * | 9/2011 | | B64C 25/00 |

* cited by examiner

*Primary Examiner* — R. A. Smith
(74) *Attorney, Agent, or Firm* — Snell & Wilmer L.L.P.

(57) ABSTRACT

An indicator assembly for an aircraft landing gear for providing indication of a hard landing. The indicator assembly including a actuator member movable when the pressure on a shock strut of the aircraft landing gear exceeds a desired load and stroke threshold indicative of a hard landing. A shear pin is coupled to the actuator member which is configured to shear when a desired level of force is applied to at least a portion of the shear pin. A visibly recognizable indictor is moved from a non-indicating position to an indicating position upon shearing of the shear pin.

13 Claims, 7 Drawing Sheets

SYSTEM FOR INDICATING AN AIRPLANE HARD LANDING

FIELD OF THE INVENTION

This invention relates to an indication system for use with an aircraft landing gear system, and more specifically to an indication system that provides a readily visible indicator after the occurrence of an aircraft hard landing.

BACKGROUND OF THE INVENTION

Aircraft landing gear often are subject to excess energy typically being driven into it's strut assembly resulting in both bottoming the strut as well as exceeding structural limitations on the attached hardware. This often constitutes a hard landing event or some other potential overloading activity.

Airlines are required to fully inspect the landing gear and aircraft if a hard landing event has occurred or has been suspected of occurring. Presently, what is often used to determine whether a hard landing event has occurred is reliance upon the pilot's senses (e.g., feels, hears or possibly sees) during flight, especially during landing and takeoff. Thus, if the pilot feels an unusually large force during landing then this must be reported and either the pilot or other personnel must inspect the landing gear system to determine if an "event" has caused any yielding/deformation to the landing gear or the airplane structure. In present systems, this type of end-of-limit indicator is not readily visible and the triggering of such a indicator may not necessarily or accurately indicate whether an event did occur. Consequently, the fallback position for the airlines in such a situation is to perform an often unwarranted fully detailed inspection of the landing gear system.

The design loads are understood, in the context of the present invention, to mean the maximum loads which the structure of the aircraft can withstand without permanent deformation or damage occurring to the aircraft. For obvious safety reasons, inspection of the structure of the aircraft, as well as repairing possible damage, have to be carried out whenever the prescribed design loads are exceeded. As mentioned above, such an inspection is generally invoked by the pilot, depending on what he/she felt at the moment of the landing and when he/she opines that this landing could have caused real damage to the structure of the aircraft. However, this detection of the loads being exceeded, based only on the subjective determination of the pilot, is often unreliable.

In effect, the reactions perceived at the level of the flight deck often do not accurately convey the real load level applied to the aircraft as a whole. That being so, a significant number of inspections, technically not justified, are invoked by the pilot, which entails inefficient use of time and superfluous expense, heavily penalizing the airline concerned. Considerable loads can be applied to the structure, without, however, giving rise to effects which can be felt at the level of the flight deck. In this case, no inspection is invoked although the aircraft structure could have been damaged, which can then entail grave and irremediable consequences during subsequent flights.

SUMMARY OF THE INVENTION

The present invention relates to an indication system as described herein in accordance with the illustrated embodiments, which may be used in conjunction with a pressure transducer located within a high pressure chamber of a shock strut, to indicate that a hard landing event has indeed been experienced by the aircraft. Accordingly, a noted advantage of the invention is a reduction in the number of costly inspections for the airlines subsequent to a hard landing event.

Generally, in one illustrated embodiment, the indication system is contained within a housing that is preferably separable relative to the outer cylinder of a landing gear shock strut assembly so that it may be moved away for maintenance activity. The indication system includes an actuator member, such as a plunger, that is movable based on a detected load and stroke within the shock strut assembly. In an additional embodiment, a secondary system may be utilized to measure the high pressure chamber of a shock strut or within another component of the landing gear system. This detected pressure may be used to determine the impact of the occurrence of the hard landing event experienced by the aircraft. Upon the occurrence of the hard landing event, the actuator member strokes by an amount sufficient to cause a component such as shear pin to physically shear (e.g., fracture). A compression spring, for example, then urges an indicator into an indicating position, which preferably is a position that is readily visible by a pilot, ground personnel or another walking around the aircraft. It is noted the compression spring urges the indicator from its non-indicating position into an indicating position and maintains it in this position preferably until the fractured shear pin has been replaced. The spring force is designed so as to prevent the plunger head from being physically forced back into the housing.

In one aspect of the invention according to an illustrated embodiment, what is provided is a device mounted to a portion of an aircraft landing gear for indicating occurrence of a hard landing of an aircraft. The device includes a housing preferably mounted to a portion of an aircraft landing gear strut assembly. This housing member may also be configured and operative to pivot outwardly relative to the landing gear shock strut assembly. The housing member preferably includes an indicator member movable from a first position to a second position such that when moved to the second position the indicator member is configured to indicate occurrence of a hard landing for the aircraft and at least a portion of the indicator member extends outwardly from the housing member when in it's second position. Further provided is an elongated actuator member movable from a first position to a second position configured and operative such that when the elongated actuator member moves to the second position it causes the indicator member to move to it's second position, and when positioned in it's first position, at least a portion of the elongated actuator member extends outwardly from the housing member. Also provided is a releasing member operatively coupled to the elongated actuator member configured to be in a first state when the elongated actuator member is in it's first position and a second state permitting said elongated member to move to it's second position upon the occurrence of a hard landing for the aircraft. Operatively coupled to the indicator mechanism is a biasing mechanism for causing the indicator member to be maintained in it's second position after the elongated actuator member is moved to it's second position.

In another aspect of the invention according to another illustrated embodiment, what is provided is an indicator member movable from a first position to a second position such that when moved to it's second position the indicator member is configured to indicate occurrence of a hard landing for an aircraft. Further provided is an elongated actuator member movable from a first position to a second position configured and operative such that when the elongated member moves to it's second position it causes the indicator member to move to it's second position. The elongated actuator member has an intermediate portion and first and second end regions wherein the intermediate portion of the elongated actuator member is pivotally coupled to a portion of the aircraft landing gear such that the first end region of the elongated actuator member is caused to pivot outwardly relative to a portion of the aircraft landing gear when the elongated actuator member is caused to move to it's second position. Additionally provided is a releasing member operatively coupled to the first end region of the elongated actuator member configured to be in a first state when the elongated actuator member is in it's first position and a second state permitting said elongated member to move to it's second position upon the occurrence of a hard landing for the aircraft. The indicator member further includes a biasing assembly for causing the first end region of the elongated actuator member to pivot outwardly relative to a portion of the aircraft landing gear when the elongated actuator member is caused to move to it's second position.

BRIEF DESCRIPTION OF THE DRAWINGS

The objects and features of the invention can be understood with reference to the following detailed description of an illustrative embodiment of the present invention taken together in conjunction with the accompanying drawings in which.

WRITTEN DESCRIPTION OF CERTAIN EMBODIMENTS OF THE INVENTION

The present invention is now described more fully with reference to the accompanying drawings, in which an illustrated embodiment of the present invention is shown. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Figure 1:
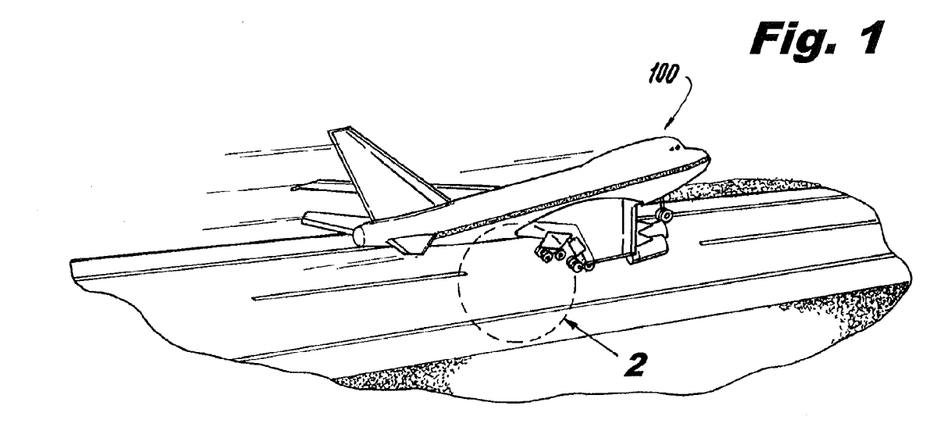
FIG. 1 illustrates a perspective view of an aircraft in a hard landing event.
Figure 2:
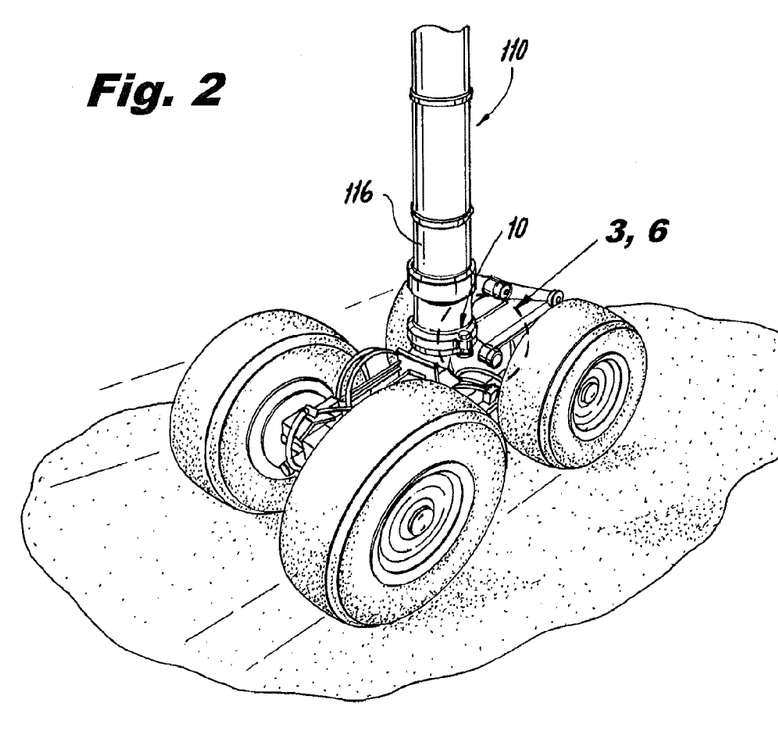
FIG. 2 illustrates a perspective view of the landing gear assembly of the aircraft of FIG. 1.

As will be apparent from the below description in accordance with an illustrated embodiment depicted in FIGS. 1-7, the present invention is to be appreciated and understood to be directed to an indication system that provides a readily visible indicator after the occurrence of a hard landing for the aircraft 100 (FIG. 1). The following description generally relates to an indication system, referenced generally by numeral 10, that operates as a mechanical overload sensor, which may be coupled or otherwise secured to a portion of the aircraft landing gear assembly 110, such as an outer cylinder portion 112 of a landing gear shock strut assembly 116 for an aircraft 100 (FIGS. 2 and 3).

Figure 3:
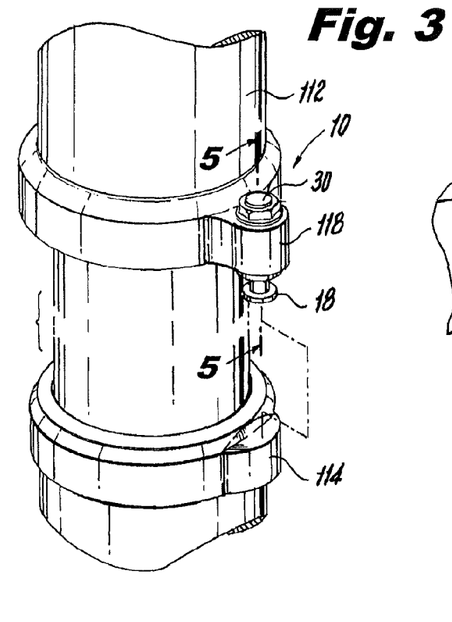
FIG. 3 illustrates an enlarged perspective of the lower cylinder portion of the landing gear assembly of FIG. 2.
Figure 4:
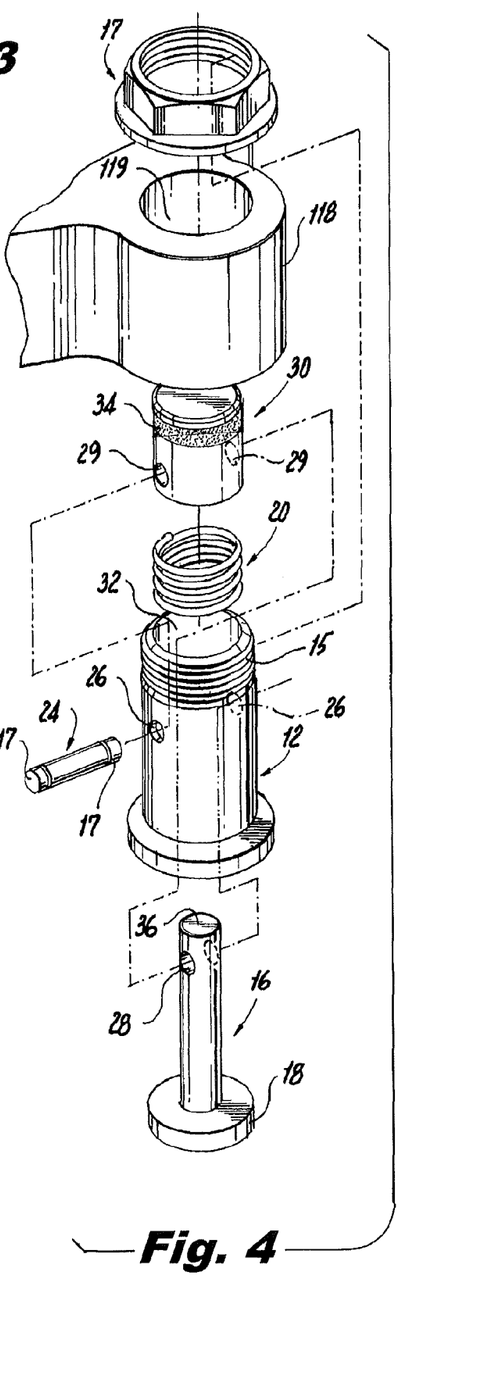
FIG. 4 illustrates an exploded assembly view of the components of the invention depicted in FIG. 3.
Figure 5:
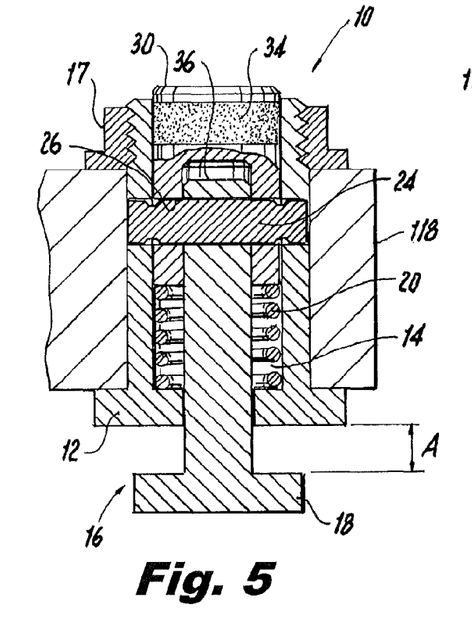
FIG. 5 illustrates a sectional elevation taken at 5-5 of FIG. 3.

With reference now to FIGS. 3-5 the indication system 10 in accordance with an illustrated embodiment is shown attached to the outer cylinder 112 of a shock strut assembly 116. The indication system 10 is preferably housed within a housing member 118 extending from the outer cylinder 112.

In the illustrated embodiment, the indication system 10 includes preferably includes a body member 12 configured and operative to be housed in housing member 118. As depicted in the illustrative embodiment, the top portion of housing member 12 is preferably provided with a threaded portion 15 configured to mate with a threaded nut 17 provided at a top portion of the housing member 118 so as to maintain body member 12 in a fixed position within a inner cylindrical portion 119 of the housing member 118.

As best shown in FIGS. 4 and 5, body member 12 is shown to have a cylindrical configuration preferably defining an inner cylindrical chamber portion 14. Slidably received in body member 12 is an actuator member, such as an elongated plunger member 16 having an enlarged plunger head portion 18 extending from a bottom end portion of the body member 12. As shown in FIG. 3, when in a de-activated position, the plunger head portion 16 is positioned at a spaced distance from the bottom end of the body member 12 (as indicated by arrow "A" in FIG. 5). A bias spring member 20 is received about an elongated portion of the plunger member 16 in the inner chamber portion 14 of the body member 12.

The indication system 10 further includes a shear pin 24, e.g. a releasing member, which is received in the housing member 16, via apertures 26 formed on body member 12, so as to then receive through apertures 29 formed in an indicator member 30 (as discussed further below) and a shear pin aperture 28 formed in a top portion of the elongated plunger member 16. As best shown in FIG. 5, the shear pin 24 preferably has its opposing ends 17 residing within the respective housing apertures 26 formed in the body member 12. As will be further understood from the below description, shear pin 24 is functional to prevent upward advancement of both the plunger member 16 and the indicator member 30 (via bias spring 20) in the inner chamber portion 14 of the body member 12 except for the occurrence of a hard landing by the aircraft 100.

With continued reference to FIGS. 3-5, the indicator member 30 is positioned within a cylindrical opening 32 formed in top portion of the body member 12 such that an indicator portion 34 provided on the indicator member 30 is preferably concealed in the inner chamber portion 14 of the body member 12 when the indicator system 10 is in the aforesaid de-activated position. The indicator portion 34 may include any means for providing visual indication of a hard landing for the aircraft 100, such a red color band. As best shown in FIG. 5, a bottom portion of the indicator member 30 is preferably provided with a bored section configured to receive the top portion 36 of the plunger member 16.

It is to be understood and appreciated (and as also described below) that upon a hard landing event for the aircraft 100, an overload condition is imparted on the shear pin 24, via an upward force applied by the plunger member 30, causing the shear pin 24 to preferably fracture at its respective end regions 17 enabling upward advancement of the indicator member 30, which is to then be maintained in this upward indicating position via the upward applied force by bias spring 20. It is noted, upon fracture, the intermediate portion of the shear pin 24 is to remain in the indicator member 30 until removal thereof.

Figures 6, 7:
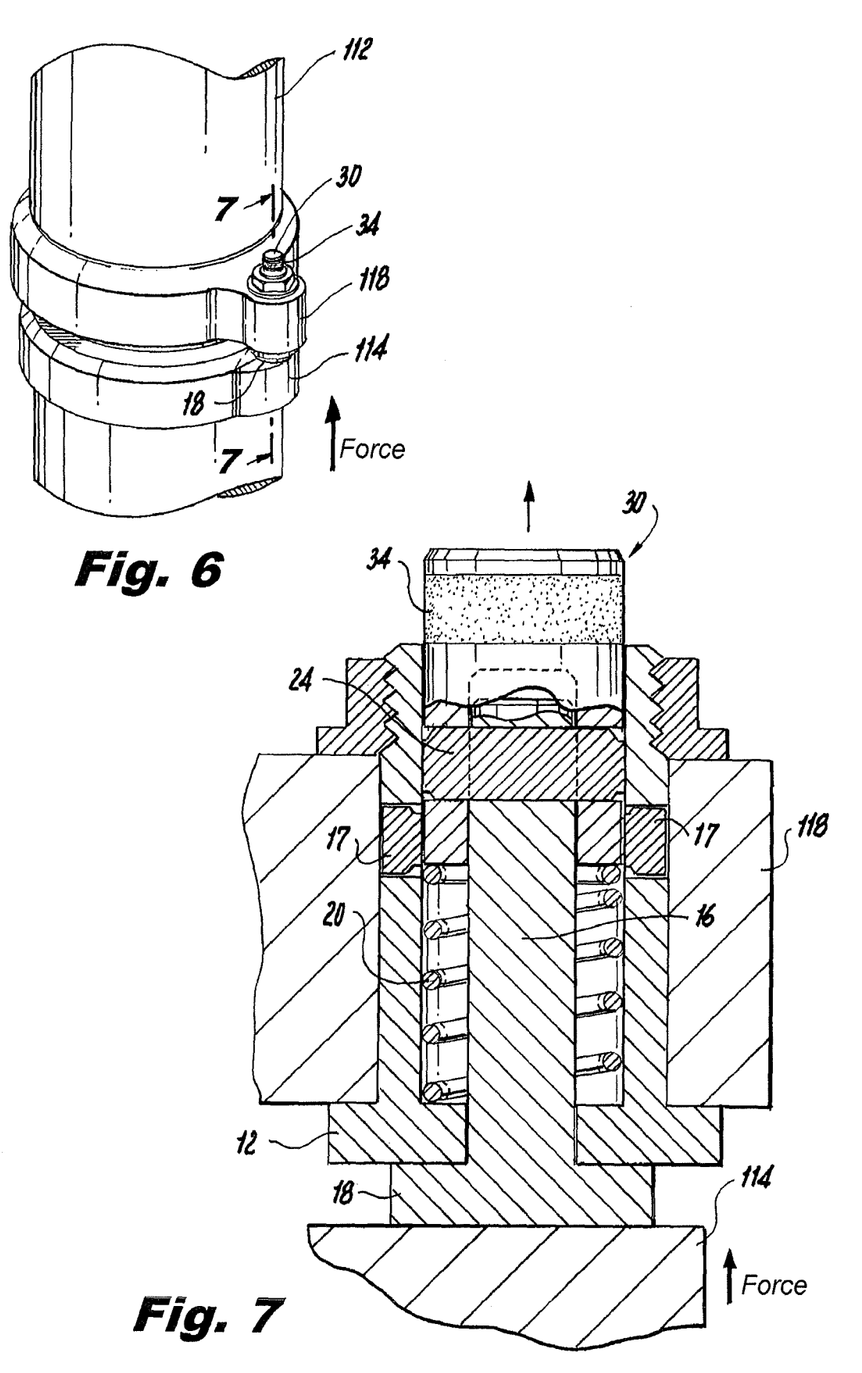
FIG. 6 illustrates a perspective of view of the invention taken at arrow 6 of FIG. 2.
FIG. 7 illustrates a sectional elevation taken at 7-7 of FIG. 6.

With a description of the indicator system 10 described above, its method of operation will now be discussed with reference to FIGS. 6 and 7 (and with continuing reference to FIGS. 1-5). If during a landing condition for the aircraft 100 its landing gear strut assembly 116 exceeds a design capability of the shock strut (i.e., an event), the plunger head 18 of the plunger 16 preferably makes contact with a portion of the landing gear piston 114, this upward movement of the plunger member 16 consequentially causes the shear pin 24 disposed within the body member 12, and received through shear pin aperture 28 formed in the plunger 16, to shear (fracture) which consequentially enables continued upward movement of the plunger member 16 in the body member 12 causing the top portion 36 of the plunger member 16 to force indicator member 30 to reciprocate upwards from the cylindrical opening 32 formed in top portion of the body member 12. This upward movement of indicator member 30 causes its indicator portion 34 to extend distally from the cylindrical opening 32 formed in top portion of the body member 12 providing visual indication that the landing gear strut assembly 118 has bottomed out and/or experienced a hard landing. It is to be understood and appreciated the indicator member 32 will stay maintained in this exposed position due to the upward force applied via the bias spring 20 until such a time when it is "reset" whereby it is forced downward and maintained therein via insertion of a non-fractured shear pin 24 in the shear pin aperture 28 formed in the plunger member 16, the apertures 29 formed in the indicator member 30 and the housing apertures 26, after which the above procedure for indicating the occurrence of a hard landing may be repeated again.

Additionally, in conjunction with the indicator system 10, a pressure transducer may be installed in a high pressure chamber of the landing gear strut assembly 116 configured and operative to read pressure therewithin, which may be converted to a load or force. Thus, when indicator system 10 indicates the occurrence of a hard landing event as mentioned above, data may be obtained from the pressure transducer and examined to determine if the internal load within the landing gear strut assembly 116 during the hard landing event was enough to warrant additional or more costly inspections.

Figure 11:
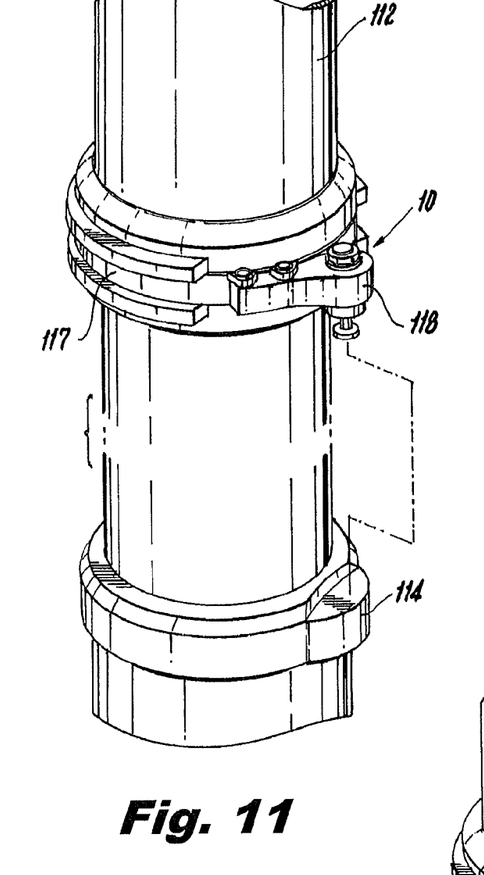
FIG. 11 illustrates a perspective of another alternate embodiment of the invention.
Figure 12:
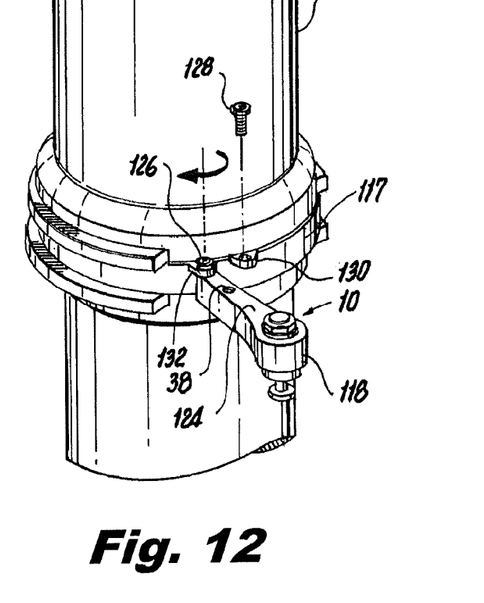
FIGS. 12 and 12A illustrate perspective views of the embodiment of FIG. 11 separated from the outer cylinder of a landing gear strut assembly.
Figure 12A:
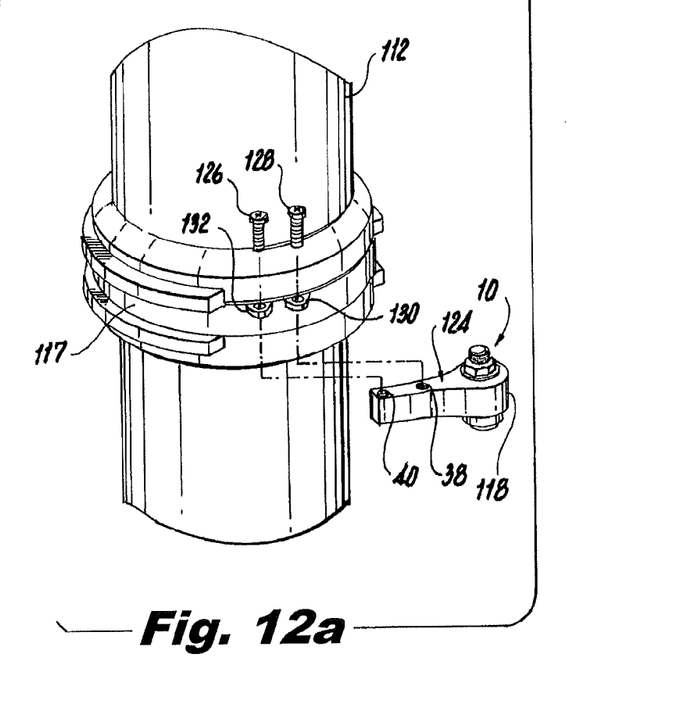
Figures 13, 14, 15:
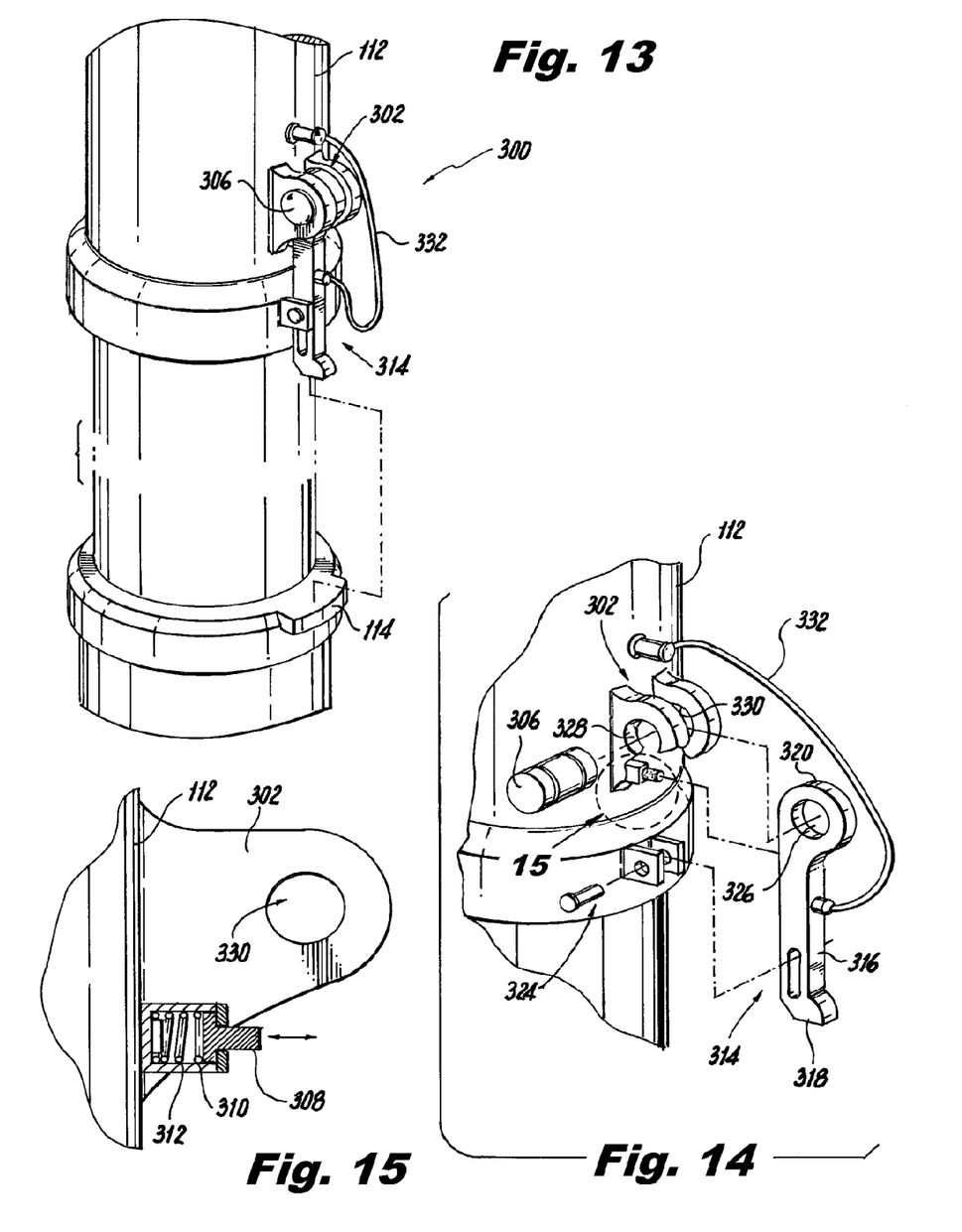
FIG. 13 illustrates a perspective view of another alternate embodiment of the invention.
FIG. 14 illustrates an exploded assembly view of the components of the invention depicted in FIG. 13.
FIG. 15 illustrates a partial side elevation view of the embodiment of FIG. 13.

With reference now to FIGS. 11 and 12, it is to be appreciated and understood the above described indicator system 10 may be coupled to the landing gear strut assembly 116 in several ways. For instance, the indicator system 10 may be coupled to the landing gear strut assembly 116 whereby it is clamped to the outer cylinder 112 such as with a ring or a strap 117 or directly coupled to lugs or bosses fixated on the outer cylinder 112. As shown in FIGS. 11 and 12, the indicator system 10 may be configured such that the housing member 118 it is housed within is either removable (FIG. 12A) or rotationally swings away from the outer cylinder 112 (e.g., during servicing)(FIG. 12B). For instance, in the illustrated embodiment of FIG. 12A, the housing member 118 is attached to a link member 124 which couples to the outer cylinder 112 via first and second screws (or pins) 126, 128 whereby removal of screws 126, 128 from threaded portions 130, 132 on the ring or strap member 117, and from threaded sockets 38, 40 provided in link member 124, enables the housing member 118 to be entirely removed from the outer cylinder 112. And with reference now to FIG. 12, when a first pin 128 is removed from the first threaded portion 130 and the first threaded socket 38, the link member 124 may be rotated about a second pin 126 remaining in the second threaded portion 132 and the second socket 40. Hence, this attachment permits the indicator system 10 to be rotated away from the outer cylinder 112 which is particularly advantageous during maintenance or servicing of the landing gear strut assembly 116.

Figures 8, 9, 10:
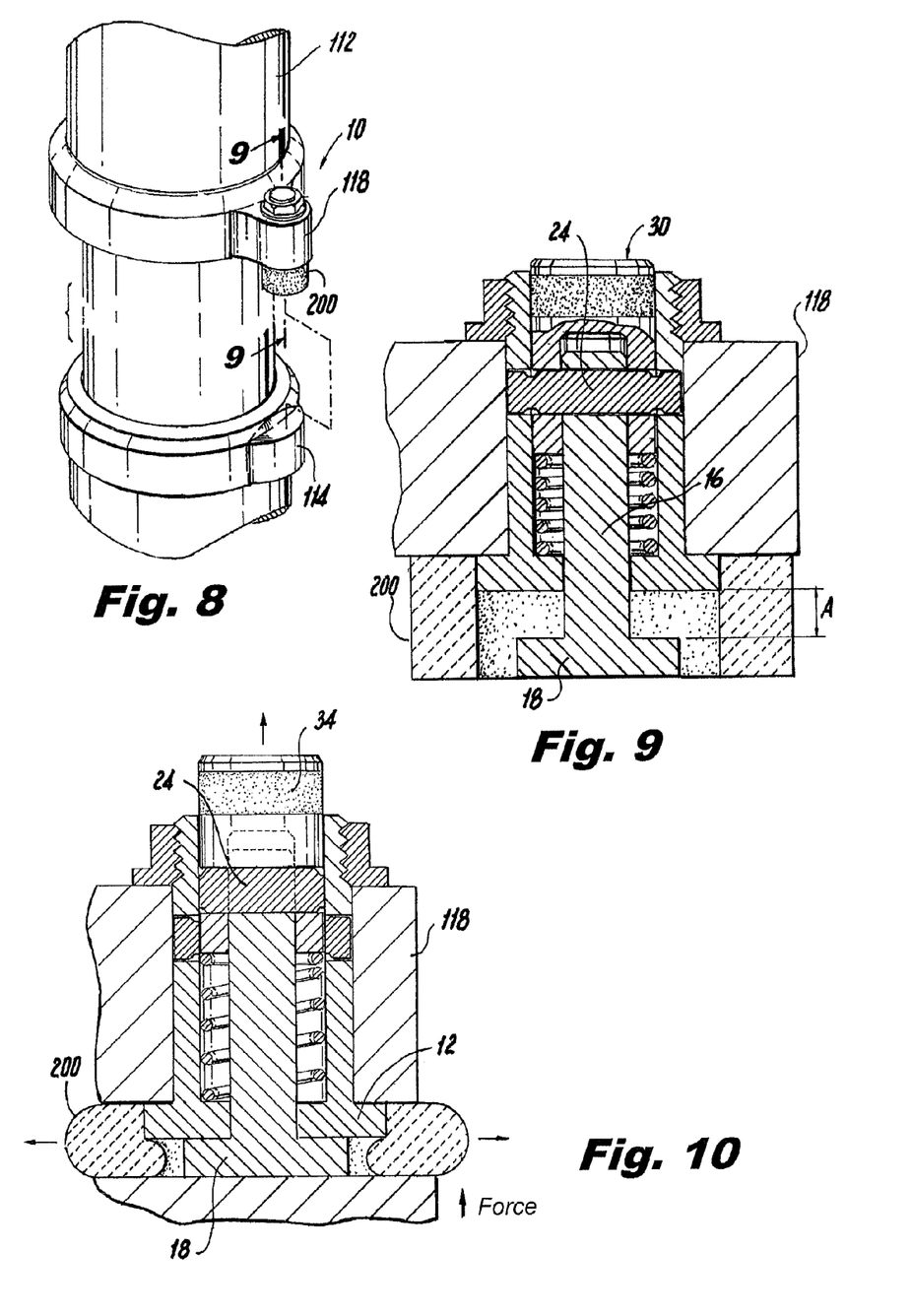
FIG. 8 illustrates a perspective of an alternate embodiment of the invention.
FIG. 9 illustrates a sectional elevation view taken at 9-9 of FIG. 8.
FIG. 10 illustrates a perspective of an alternate embodiment of the invention of FIG. 8 during the occurrence of a hard landing event.

With reference now to FIGS. 8-10, another illustrated embodiment of the present invention is shown which is substantially identical to that shown in FIGS. 3-7 with the exception being the provision of a crushable core member 200 provided about the plunger head portion 18 of the plunger member extending outwardly from the body member 12 when in the de-activated position of FIG. 9. It is to be understood and appreciated the crushable core member 200 may be formed of any suitable crushable material, such as those commercially available from Hexcel. Thus, when in a activated position (e.g., the occurrence of a hard landing as described above) as shown in FIG. 10, the crushable material 200 is caused to be compressed or crushed by the upward movement of the plunger head 18 which enables indicator system 10 to experience a full servicing load which causes the plunger to only shear the shear pin 24 at loads exceeding a design capability as defined by the crushable material 200.

With reference now to FIGS. 13-17, another illustrated embodiment of the present invention is shown which illustrates a pivot-type indicator system 300 attached to an outer cylinder 112 having a protruding lug or boss 302. In this illustrated embodiment, a an indicator member 308 is movable from a first position (FIG. 16) to a second position (FIG. 17) such that when moved to it's second position the indicator member 308 is configured to indicate occurrence of a hard landing for the aircraft 100. The indicator member 308 is preferably housed and configured for reciprocating movement in a housing member 310 extending externally from the outer cylinder 112. A bias spring member 312 is preferably located in the housing member 310 configured to cause at least a portion of the indicator member 308 to outwardly extend from the housing member 310, as mentioned below.

An elongated actuator member 314 is provided which is configured and operable to be movable from a first position (FIG. 16) to a second position (FIG. 17) such that when the elongated actuator member 314 moves to its second position (FIG. 17) it causes the indicator member 308 to move to its second position wherein at least a portion of the indicator member 308 is exposed to indicate the occurrence of a hard landing for the aircraft 100. The elongated actuator member 314 is formed with an intermediate portion 316 and first 318 and second 320 end regions. A portion of the intermediate portion 316 of the elongated actuator member 314 is formed with a cutout portion 322 which is preferably pivotally coupled to a portion of the outer cylinder 112, via a pivot pin assembly 324. The first end 318 of the elongated actuator member 314 is configured to preferably strike a portion of the piston 114 of the landing gear strut assembly 116 during the occurrence of a hard landing event. The second end of the elongated actuator member 314 is preferably formed with an aperture configured to receive a shear pin 306, e.g. a releasing member, as further mentioned below. As will be apparent below, the second end 320 of the elongated actuator member 314 is caused to pivot outwardly relative to the outer cylinder 112 when the elongated actuator member 314 is caused to move to its second position (e.g., strike the piston portion 114 of the landing gear strut assembly 110) (FIG. 17).

The shear pin 306 is preferably disposed in an aperture 326 formed in the second end 320 of the elongated actuator member 314 which also receives through apertures 328, 330 formed in each boss member 302 extending from the outer cylinder 112. The shear pin 306 is configured to be in a first state (e.g., unbroken) when the elongated actuator member 314 is in it's first position (FIG. 16) and a second state (e.g., a sheared and/or fractured) permitting said elongated member 314 to pivot about pivot pin assembly 324 and move to it's second position (FIG. 17) upon the occurrence of a hard landing for the aircraft 100.

Thus, the shear pin 306 is secured in the boss member 302 and is operatively coupled to an elongated actuator member 314, which elongated actuator member 314 has a first end 318 configured to contact a portion of the piston 114 of the landing gear strut assembly 116 during a hard landing event. Such contact linearly moves the elongated actuator member 314 upward relative to its cutout portion 322 causing the second end 320 of the elongated actuator member 314 to shear (e.g., break) the shear pin 306. In turn, the second end 320 of the elongated actuator member 314 rotates away from the outer cylinder 112, via pivot pin assembly 324 and the force of the spring loaded indicator member 308. It is to be appreciated a cable 332 may be attached to the elongated actuator member 314 and to the outer cylinder 112 to avoid foreign object damage (FOD) and limit an amount of rotation of the elongated actuator member 314.

Figures 16, 17:
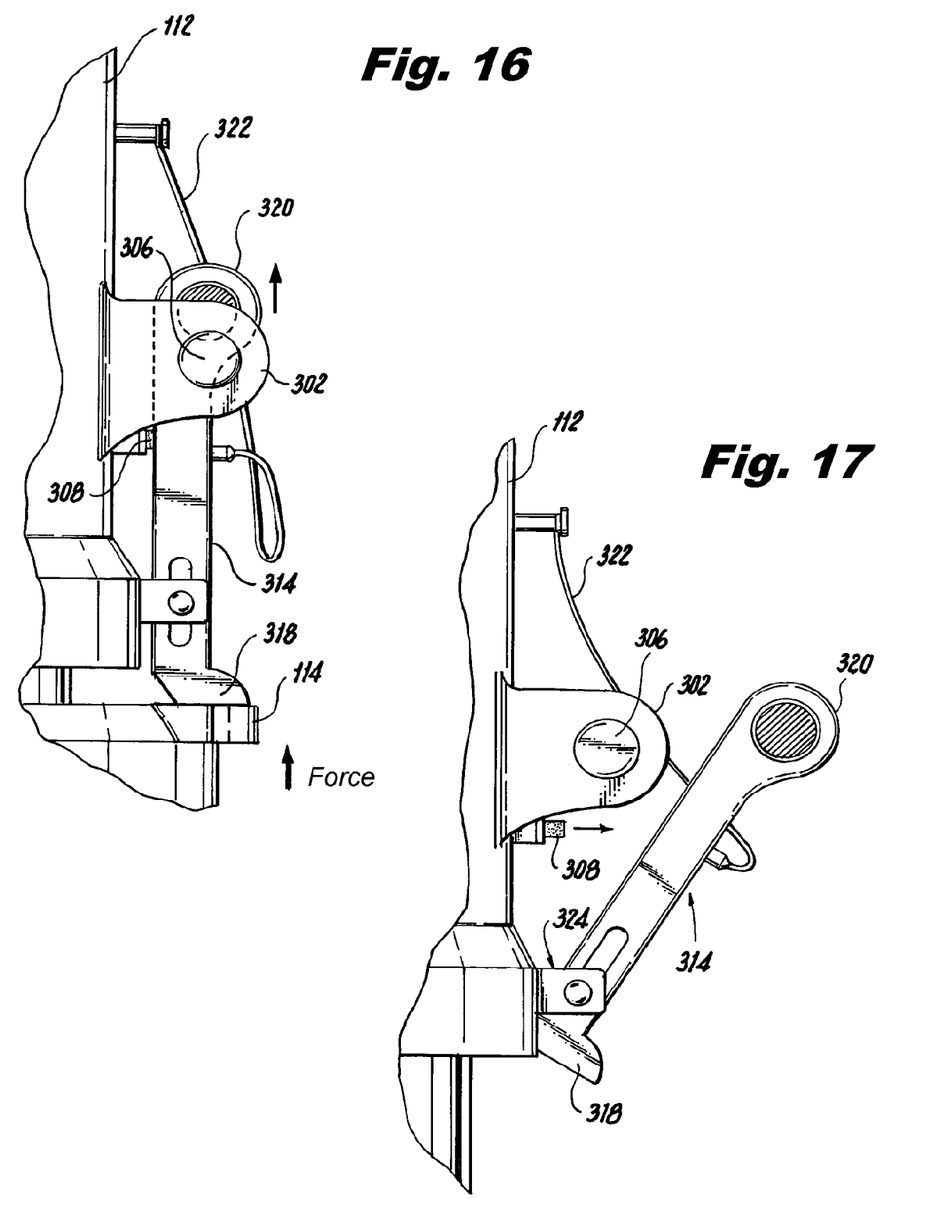
FIG. 16 illustrates a side elevation view of the embodiment of FIG. 13 in a de-activated state.
FIG. 17 illustrates a perspective of embodiment of FIG. 13 during the occurrence of a hard landing event.

With reference to FIG. 17, upon shearing of the shear pin 306, the second end 320 of the elongated actuator member 314 rotates away from the outer cylinder 112, via pivot pin assembly 324, which causes at least a portion of the indicator member 308 to deflect outwardly from the housing member 312 (via bias spring 312) causing the aforesaid outward pivot movement of the actuator member 314 preferably by an amount sufficient to permit a colored or otherwise visible portion of indicator member 308 to be exposed from housing member 310 indicating the occurrence of a hard landing for the aircraft 100.

In the illustrated embodiment, it is to be appreciated and understood the shear pin 306 may be a shear pin having a strength capacity that corresponds to a maximum design load while also accounting for a tolerance of the pin's shear strength dimensions and/or properties. A noted advantage is the shear pin 306 can be designed in correlation with the maximum design limit load and therefore eliminate the need to measure the shock strut internal pressure.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

The above presents a description of a best mode contemplated for carrying out the present invention system for indicating an occurrence of a hard landing, and of the manner and process of making and using them, in such full, clear, concise, and exact terms as to enable any person skilled in the art to which it pertains to make and use these devices and methods. The present invention system for indicating an occurrence of a hard landing is, however, susceptible to modifications and alternative method steps from those discussed above that are fully equivalent. Consequently, the present invention system for indicating an occurrence of a hard landing is not limited to the particular embodiments disclosed. On the contrary, the present invention system for indicating an occurrence of a hard landing encompasses all modifications and alternative constructions and methods coming within the spirit and scope of the present invention.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim, if any, is expressed as a means or step for performing a specified function, it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. A device mounted to a portion of an aircraft landing gear for indicating occurrence of a hard landing for an aircraft, comprising:
    an indicator member movable from a first position to a second position such that when moved to the second position the indicator member is configured to indicate occurrence of a hard landing for the aircraft;
    an actuator member movable from a first position to a second position configured and operative such that when the actuator member moves to the second position it causes the indicator member to move to the second position;
    a releasing member operatively coupled to the actuator member configured to be in a first state when the actuator member is in the first position and a second state permitting said actuator member to move to the second position upon the occurrence of a hard landing for the aircraft; and
    a housing member mounted to a portion of an aircraft landing gear wherein each of the indicator member, the actuator member, and the releasing member are contained in the housing member such that at least a portion of the actuator member extends from the housing member when the actuator member is in the first position and at least a portion of the indicator member extends from the housing member when the indicator member is in the second position;
    wherein the housing member is mounted to a portion of a landing gear shock strut assembly; and wherein the housing member is mounted to a portion of a boss member extending from the landing gear shock strut assembly.

2. A device mounted to a portion of an aircraft landing gear for indicating occurrence of a hard landing for an aircraft, comprising:

an indicator member movable from a first position to a second position such that when moved to the second position the indicator member is configured to indicate occurrence of a hard landing for the aircraft;

an actuator member movable from a first position to a second position configured and operative such that when the actuator member moves to the second position it causes the indicator member to move to the second position;

a releasing member operatively coupled to the actuator member configured to be in a first state when the actuator member is in the first position and a second state permitting said actuator member to move to the second position upon the occurrence of a hard landing for the aircraft; and a housing member mounted to a portion of an aircraft landing gear wherein each of the indicator ember, the actuator member, and the releasing member are contained in the housing member such that at least a portion of the actuator member extends from the housing member when the actuator member is in the first position and at least a portion of the indicator member extends from the housing member when the indicator member is in the second position;

wherein the housing member is mounted to a portion of a landing gear shock strut assembly and wherein the housing member is configured and operative to pivot outwardly relative to the landing gear shock strut assembly.

3. A device mounted to a portion of an aircraft landing gear for indicating occurrence of a hard landing for an aircraft as recited in claim 2 wherein the housing member further includes a pivot pin assembly and a locking assembly such that the pivot pin assembly is configured to permit the housing assembly to pivot outwardly relative to the landing gear shock strut assembly about the first pin assembly and the locking assembly is configured to have a first state preventing pivoting movement of the housing assembly and a second state permitting pivoting movement of the housing assembly.

4. A device mounted to a portion of an aircraft landing gear for indicating occurrence of a hard landing for an aircraft, comprising:

an indicator member movable from first position to a second position such that when moved to the second position the indicator member is configured to indicate occurrence of a hard landing for the aircraft;

an actuator member movable from a first position to a second position configured and operative such that when the actuator member moves to the second position it causes the indicator member to move to the second position;

a releasing member operatively coupled to the actuator member configured to be in a first state when the actuator member is in the first position and a second state permitting said actuator member to move to the second position upon the occurrence of a hard landing for the aircraft; and a biasing mechanism for causing the indicator member to be maintained in the second position after the actuator member is moved to the second position;

wherein the biasing mechanism includes at least one biasing spring member.

5. A device mounted to a portion of an aircraft landing gear for indicating occurrence of a hard landing for an aircraft, comprising:

an indicator member movable from a first position to a second position such that when moved to the second position the indicator member is configured to indicate occurrence of a hard landing for the aircraft;

an actuator member movable from a first position to a second position configured and operative such that when the actuator member moves to the second position it causes the indicator member to move to the second position;

a releasing member operatively coupled to the actuator member configured to be in a first state when the actuator member is in the first position and a second state permitting said actuator member to move to the second position upon the occurrence of a hard landing for the aircraft; and a housing member mounted to a portion of an aircraft landing gear wherein each of the indicator member, the actuator member, and the releasing member are contained in the housing member such that at least a portion of the actuator member extends from the housing member when the actuator member is in the first position and at least a portion of the indicator member extends from the housing member when the indicator member is in the second position;

wherein the housing member is mounted to a portion of a landing gear shock strut assembly and wherein the housing member is mounted to a portion of a cylinder member of a landing gear shock strut assembly in spaced relationship from a cooperating piston member for the cylinder member such that the portion of the actuator member extending from the housing assembly is operative to contact a portion of the piston member upon occurrence of a hard landing.

6. A device mounted to a portion of an aircraft landing gear for indicating occurrence of a hard landing for an aircraft, comprising:

an indicator member movable from a first position to a second position such that when moved to the second position the indicator member is configured to indicate occurrence of a hard landing for the aircraft;

an elongated actuator member movable from a first position to a second position configured and operative such that when the elongated actuator member moves to the second position it causes the indicator member to move to the second position; and a releasing member operatively coupled to the elongated actuator member configured to be in a first state when the elongated actuator member is in the first position and a second state permitting said elongated actuator member to move to the second position upon the occurrence of a hard landing for the aircraft;

wherein an intermediate portion of the elongated actuator member is pivotally coupled to a portion of the aircraft landing gear such that an end region of the elongated actuator member is caused to pivot outwardly relative to a portion of the aircraft landing gear when the elongated actuator member is caused to move to the second position.

7. A device mounted to a portion of an aircraft landing gear for indicating occurrence of a hard landing for an aircraft as recited in claim 6 wherein the indicator member includes a biasing assembly for causing said end region of the elongated actuator member to pivot outwardly relative to a portion of the aircraft landing gear when the elongated actuator member is caused to move to the second position.

8. A device mounted to a portion of an aircraft landing gear for indicating occurrence of a hard landing for an aircraft as recited in claim 7 wherein the biasing mechanism includes at least one biasing spring member.

9. A device mounted to a portion of an aircraft landing gear for indicating occurrence of a hard landing for an aircraft, comprising:
- a housing member mounted to a portion of an aircraft landing gear strut assembly, the housing member including:
- an indicator member movable from a first position to a second position such that when moved to the second position the indicator member is configured to indicate occurrence of a hard landing for the aircraft and at least a portion of the indicator member extends outwardly from the housing member when in the second position;
- an actuator member movable from a first position to a second position configured and operative such that when the actuator member moves to the second position it causes the indicator member to move to the second position and when positioned in the first position at least a portion of the actuator member extends outwardly from the housing member;
- a releasing member operatively coupled to the actuator member configured to be in a first state when the actuator member is in the first position and a second state permitting said actuator member to move to the second position upon the occurrence of a hard landing for the aircraft; and
- a biasing mechanism for causing the indicator member to be maintained in the second position after the actuator member is moved to the second position;
- wherein the housing member is mounted to a portion of a cylinder member of a landing gear shock strut assembly in spaced relationship from a cooperating piston member of the cylinder member such that the portion of the actuator member extending from the housing assembly is operative to contact a portion of the piston member upon occurrence of a hard landing for the aircraft.

10. A device mounted to a portion of an aircraft landing gear for indicating occurrence of a hard landing for an aircraft as recited in claim 9 wherein the releasing member is a shear pin configured such that when in the first state it has a unitary structure and has a non-unitary structure when in the second state such that the shear pin is caused to be in the second state upon a predetermined threshold load being applied to a portion of the shear pin by a portion of the actuator member.

11. A device mounted to a portion of an aircraft landing gear for indicating occurrence of a hard landing for an aircraft, comprising:
- an indicator member movable from a first position to a second position such that when moved to the second position the indicator member is configured to indicate occurrence of a hard landing for the aircraft;
- an actuator member movable from a first position to a second position configured and operative such that when the actuator member moves to the second position it causes the indicator member to move to the second position, the actuator member having an intermediate portion and first and second end regions wherein the intermediate portion of the actuator member is pivotally coupled to a portion of the aircraft landing gear such that the first end region of the actuator member is caused to pivot outwardly relative to a portion of the aircraft landing gear when the actuator member is caused to move to the second position; and
- a releasing member operatively coupled to the first end region of the actuator member configured to be in a first state when the actuator member is in the first position and a second state permitting said actuator member to move to the second position upon the occurrence of a hard landing for the aircraft.

12. A device mounted to a portion of an aircraft landing gear for indicating occurrence of a hard landing for an aircraft as recited in claim 11 wherein the indicator member includes a biasing assembly for causing the first end region of the actuator member to pivot outwardly relative to a portion of the aircraft landing gear when the actuator member is caused to move to the second position.

13. A device mounted to a portion of an aircraft landing gear for indicating occurrence of a hard landing for an aircraft as recited in claim 12 wherein the releasing member is a shear pin configured such that when in the first state it has a unitary structure and has non-unitary structure when in the second state such that the shear pin is caused to be in the second state upon a predetermined threshold load being applied to a portion of the shear pin by the first end region of the actuator member.

* * * * *